United States Patent
Müller et al.

(10) Patent No.: US 6,561,079 B1
(45) Date of Patent: May 13, 2003

(54) STEAM GENERATING DEVICE FOR HEATING AND/OR FROTHING LIQUIDS

(75) Inventors: Roland Müller, Dreieich (DE); Manfred Klawuhn, Frankfurt am Main (DE); Jürgen W. Zils, Kronberg (DE)

(73) Assignee: Braun GmbH (DE)

( * ) Notice: Subject to any disclaimer, the term of this patent is extended or adjusted under 35 U.S.C. 154(b) by 49 days.

(21) Appl. No.: 09/666,180

(22) Filed: Sep. 21, 2000

(30) Foreign Application Priority Data

Sep. 24, 1999 (DE) .......................................... 199 45 977

(51) Int. Cl.⁷ ................................................ A47J 31/00
(52) U.S. Cl. .............................. 99/282; 99/283; 99/293; 99/302 P; 99/305; 99/323.3
(58) Field of Search ................................ 99/323.3, 281, 99/293, 300, 302 P, 280, 283, 282, 305

(56) References Cited

U.S. PATENT DOCUMENTS

| | | | |
|---|---|---|---|
| 5,375,508 A | * 12/1994 | Knepler et al. | 99/280 |
| 5,647,269 A | * 7/1997 | Miller et al. | 99/279 |
| 5,778,765 A | 7/1998 | Klawuhn et al. | 99/290 |
| 5,992,298 A | * 11/1999 | Illy et al. | 99/281 |
| 6,000,317 A | * 12/1999 | Van Der Meer | 99/282 |

FOREIGN PATENT DOCUMENTS

| | | | |
|---|---|---|---|
| EP | 0 251 124 A2 | 1/1988 | ............ A47J/31/44 |
| EP | 0 781 520 A1 | 7/1997 | |
| EP | 0 797 945 A1 | 10/1997 | ............ A47J/31/46 |

* cited by examiner

*Primary Examiner*—Keith Hendricks
*Assistant Examiner*—Drew Becker
(74) *Attorney, Agent, or Firm*—Fish & Richardson PC

(57) ABSTRACT

The steam generating device (1) is used to heat and/or froth liquids, especially milk. It includes an electrically driven pump (3) supplied with water from a water source (2), which pump delivers water in a controlled fashion to a continuous flow heater (6) heated by an electrically operated heating (22) by way of a conduit (13). The continuous flow heater (6) heats the water it receives in its steam pipe (18) to steam that is subsequently supplied to a steam tapping point, preferably a steam nozzle (7), where the steam exits under pressure. An intermediate tank (5) with an overflow chamber (53) which stores a defined quantity of water is provided in the conduit (13) between the pump (3) and the steam pipe (18). When the steam generating device (1) is switched on, the pump (3) is switched on simultaneously with the heating (22), and after the switch-on the water delivered by the pump (3) flows into the chamber (53) of the intermediate tank (5) and is retained there so long and is not delivered further to the continuous flow heater (6) until the continuous flow heater (6) has reached a temperature sufficient to evaporate water.

17 Claims, 2 Drawing Sheets

STEAM GENERATING DEVICE FOR HEATING AND/OR FROTHING LIQUIDS

TECHNICAL FIELD

The present invention relates to generating steam for heating and/or frothing liquids, especially milk.

BACKGROUND

EP 0 781 520 Al discloses a steam generating device of this type. In the Cappuccino position, that is the position where steam for frothing milk is desired, switches S1 and S2 adopt the position in which the tube heating element of the continuous flow heater is energized. Simultaneously, the electric control means is actuated by way of the input so that the electric motor drives the piston pump and pumps water into the water pipe of the continuous flow heater, where it evaporates and is conducted via the output line to the steam nozzle. The steam is accelerated in the steam nozzle and will then exit at the end of the steam nozzle (FIGS. 1 and 2 of EP 0 781 520 Al).

Thus, the instant when the pump starts to deliver water is the very instant when the heating device begins to heat the water heater. The result is that the water heater is not yet so heated up as to be in a position to entirely evaporate the volume of water it receives. The final result is that hot water or a hot steam/water mixture exits from the steam nozzle. This impairs the quality of the frothing result.

Further, it is known from Espresso machines that a waiting time is necessary after switch-on of the Espresso machine until the continuous flow heater has reached its operating temperature that is required for the generation of steam so that only steam will exit from the nozzle. This necessitates a signalling means which indicates when the frothing operation can be started. This arrangement causes prolonged waiting times and disadvantages of use of the appliance.

SUMMARY

An object of the present invention is to provide a steam generating device for heating and/or frothing liquids, especially milk, for a hot beverage machine which produces steam by especially simple means in a shortest possible time. An additional objective is to provide a method therefor which permits automatically controlling the steam generation after switch-on of the appliance with equally simple means.

The provision of an intermediate tank with an overflow chamber (which represents in the system a sort of buffer for the intermediate storage of water or a delay time element) between the pump and the steam pipe of the continuous flow heater permits achieving by especially simple means that water will not exit from the discharge of the intermediate tank and propagate to the continuous flow heater until the continuous flow heater has reached its operating temperature. The rate of delivery of the pump, the filament power of the continuous flow heater and the accumulation volume of the intermediate tank must be so conformed to one another that water will only be conducted into the continuous flow heater when the latter has reached the operating temperature that is required for the generation of steam. Thus, the present invention eliminates the need for sophisticated time delay elements because, according to the present invention, activation of the steam generating device causes simultaneous switch-on of the pump and the heating device of the continuous flow heater, and the intermediate tank will retain the water delivered until the continuous flow heater has reached its operating temperature necessary for steam generation.

Instead of an intermediate tank, it is also possible to choose a hose portion of a certain length in which the quantities of water delivered by the pump are received until the continuous flow heater has reached its operating temperature. In this event, too, it would be advantageous that the hose-side end to the continuous flow heater has an elevated position vis-à-vis the intake to prevent a too quick propagation of water into the continuous flow heater. The hose acts as a type of overflow chamber also in this arrangement.

The overflow chamber in one embodiment may extend substantially horizontally in its longitudinal direction and may be separated by a vertical wall from the discharge so that the excess water flows over the wall and into the discharge of the intermediate tank and, thus, into the steam pipe only when the overflow chamber is filled with water. In this embodiment, the intake and the discharge may be designed at the same level or at different levels. If, however, according to another embodiment, the intermediate tank extends vertically in its longitudinal direction, the discharge is required to be arranged at the chamber at the level which defines the chamber volume that is sufficient to take up so much water that the heating device has reached its operating temperature exactly when overflow begins.

It is possible that the intake is arranged above the discharge on the intermediate tank, that means, the actual intermediate tank is positioned below the intake and also below the discharge. In another variation, wherein the intake is designed on the bottom of the intermediate tank, the actual intermediate tank is arranged above the intake. In this event, the discharge is also disposed in the longitudinal direction of the intermediate tank above the intake.

The intermediate tank may include a discharge which has a pressure relief valve that opens in the presence of inadmissible excess pressure in the intermediate tank and discharges steam or water to the atmosphere. Inadmissibly high pressures in the intermediate tank which might cause explosion or leakage of the intermediate tank or of parts of the entire water/steam system are this way prevented.

In some embodiments, the intermediate tank is succeeded by a pressure chamber in which a piston that is displaceable in opposition to the force of a spring is guided, the said piston shutting off the discharge to the atmosphere in the closed position and opening the pressure chamber with the discharge in the open position. A pressure relief valve of this type is especially easy to manufacture and can be integrated especially simply into the pressure chamber that is directly adjacent to the intermediate tank. Advantageously, the pressure chamber and the intermediate tank form a chamber which is configured as a cylindrical bore. This chamber may be provided especially easily.

The piston may have an indentation in the shape of a hollow chamber on its side facing the intermediate tank. This indentation serves as a pressure cushion and, additionally, as a steam accumulator. The purpose of the pressure cushion containing a steam/air mixture is to prevent the steam which flows back into the intermediate tank when the pump and the continuous flow heater are switched off from immediately condensing in the cold water.

Another aspect of the invention features a method for steam generation in a steam generating device wherein both the pump and the continuous flow heater switch on after the appliance is switched on. The water delivered by the pump is now initially supplied to the intermediate tank configured as overflow tank and accumulated therein until the continuous flow heater has reached its operating temperature required for the steam generation. The rate of delivery of the pump and the accumulation volume of the intermediate tank are conformed to the filament power of the continuous flow heater so that water will not flow into the steam pipe until the continuous flow heater or the steam pipe has reached its temperature that is required for the generation of steam. Exclusively steam which exits at the steam tapping point, preferably from the steam nozzle, is generated by the method of the present invention in a time-delayed manner after the appliance is switched on. The method of the present invention does not require sophisticated electronic time elements or other electronic sensing means which indicate to a user at what point of time the continuous flow heater has reached its operating temperature so that the appliance activates the pump only then, or manual activation is rendered possible.

In some cases the method permits evacuation of the intermediate tank after each process of steam generation in order to make the intermediate tank available again in its function for the next case of use.

One embodiment is illustrated in the accompanying drawings and will be explained in detail hereinbelow.

DETAILED DESCRIPTION

Figure 1:
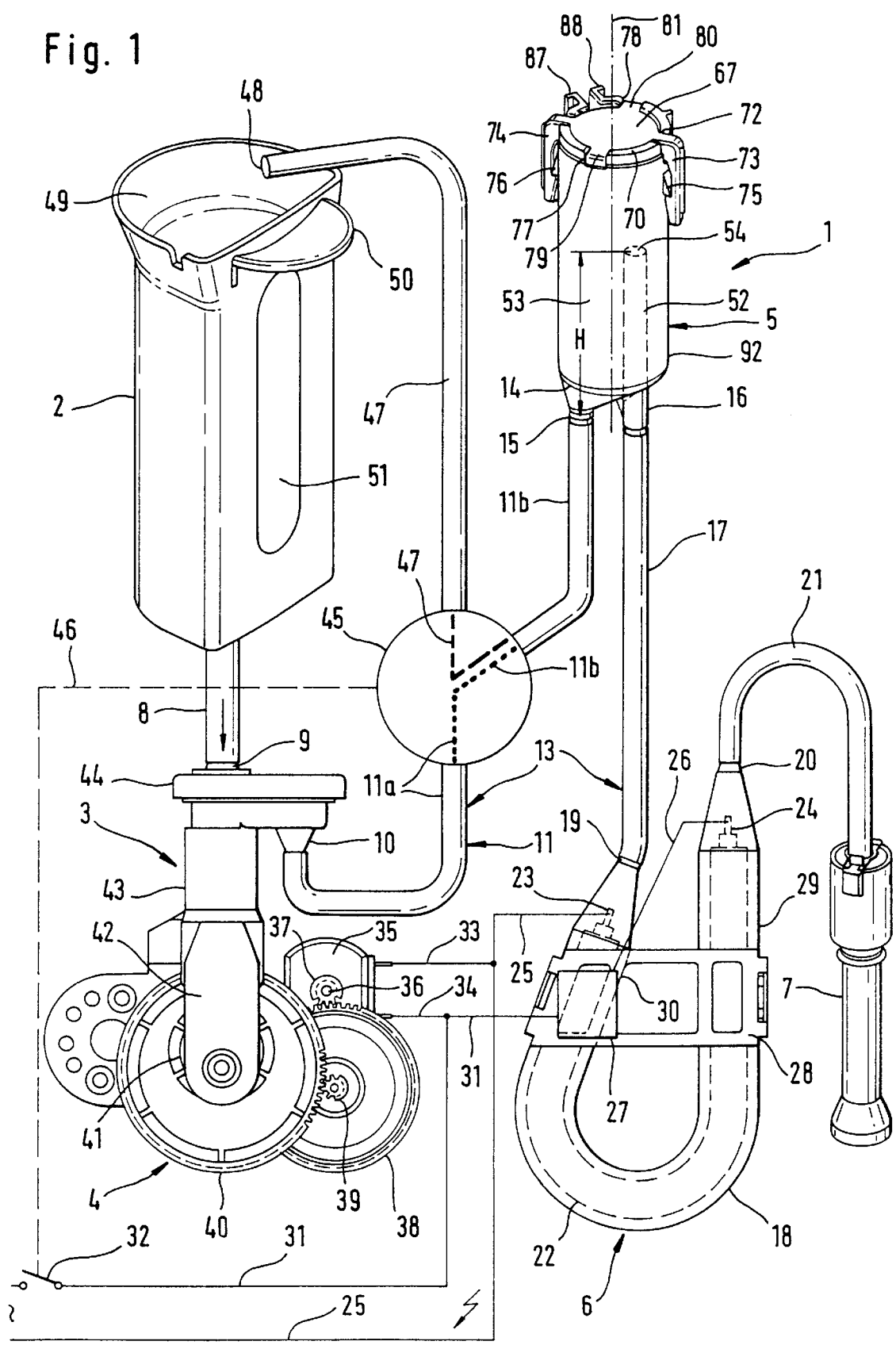
FIG. 1 is a schematic view of the design of a steam generating device

FIG. 1 shows a steam generating device 1 which is generally comprised of a water tank 2 that is preferably used only for the generation of steam, a pump 3 configured as a piston pump with a gear unit 4, an intermediate tank 5, a continuous flow heater 6, and a steam nozzle 7. The water tank 2 is connected to the inlet port 9 of the pump 3 by way of a water conduit 8. The outlet port 10 communicates by way of a first portion 11 of conduit 13, which connects the pump 3 to the steam pipe 18 of the continuous flow heater 6, with the intake 15 arranged on the bottom 14 of the intermediate tank 5.

Figure 2:
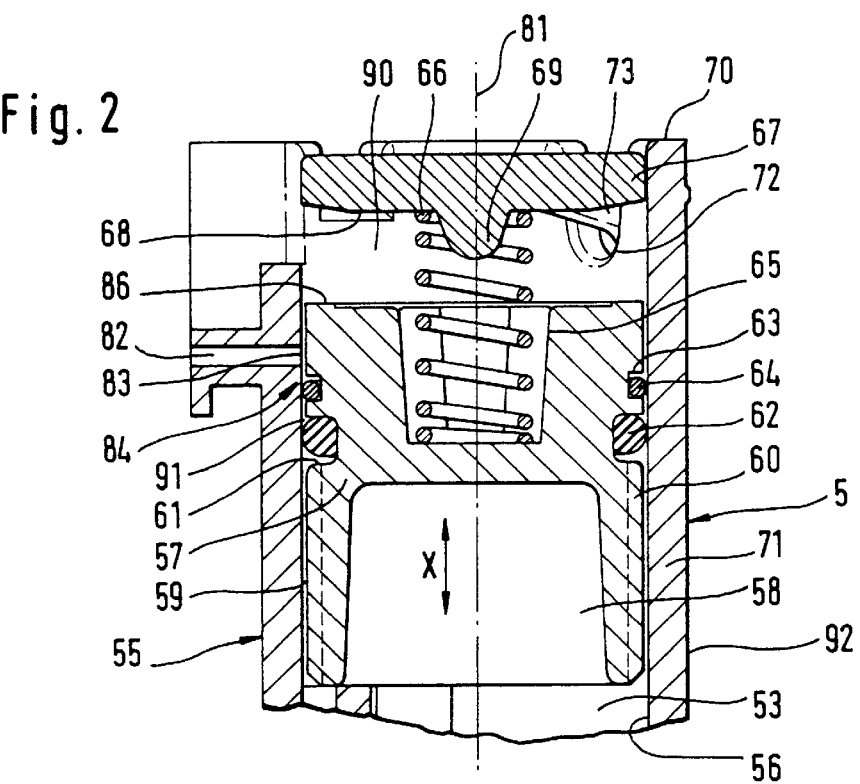
FIG. 2 is a longitudinal cross-section taken through the top part of the intermediate tank, wherein the pressure relief valve has adopted its closed position.
Figure 3:
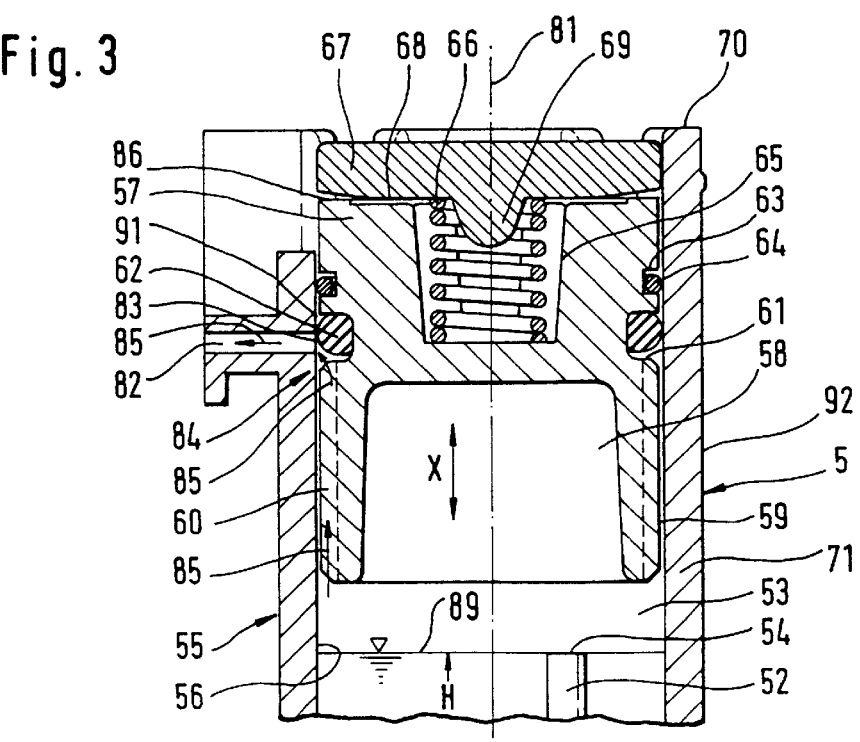
FIG. 3 is a longitudinal cross-section taken through the top part of the intermediate tank, as shown in FIG. 2, however, in this arrangement the pressure relief valve has reached its open position, at excess pressure in the pressure chamber.

As can be seen in FIGS. 1 to 3, a discharge 16 projects alongside the intake 15 from the bottom 14 in a downward direction, discharge 16 being connected to the steam inlet 19 of the steam pipe 18 of the continuous flow heater 6 by way of the second portion 17 of conduit 13. The steam outlet 20 is connected via steam conduit 21 to the steam nozzle 7 which is detachably fastened and sealed at the end of the steam conduit 21. Steam nozzle 7 will not be referred to herein in detail because its operation and design is widely known in patent literature, such as, for example, from the description of DE 43 27 085.9-16.

Because the steam generating device 1 illustrated in FIG. 1 shows only the necessary component parts, it is not shown how it can be installed into a housing of a machine for the preparation of hot beverages (not shown). Other than shown herein, the continuous flow heater 6 will not be installed vertically but horizontally in a beverage preparing machine in order that the water is prevented from immediately flowing to the middle of the steam pipe 18, but instead flows slowly into the steam inlet 19 so that it will heat already at the beginning in the steam pipe 18. It should be mentioned herein that, according to FIG. 1, the heating rod 22 of the continuous flow heater 6 is provided below the steam pipe 18 and soldered or welded to it, or attached to it in a properly heat-conducting manner in any other way, in order that the heat emanating from the heating rod 22 flows as evenly as possible from downwards into the steam pipe 18.

According to FIG. 1, the heating rod 22 includes contact lugs 23, 24 at its ends which are connected to electric lines 25, 26. The electric line 26 is connected to a temperature switch 27 which is secured to a transverse web 28 arranged on the continuous flow heater 6. Because the continuous flow heater has a generally U-shaped design (other configurations such as a thermoblock or a vessel-shaped structure are also possible), the transverse web 28 interconnects the two legs 29, 30 of the continuous flow heater 6 and forms a mounting support for the continuous flow heater 6 itself. The transverse web 28 is preferably soldered or welded to the two legs 29, 30.

The temperature switch 27, by way of an electric inlet line 31, is connected to an electric switch 32 which switches the steam generating device 1 on and off according to FIG. 1. The contact lug 23 of the heating rod 22 is connected to the negative pole of the electric switch 32 by way of the electric line 25. In parallel to the lines 25, 31, the electric motor 35 is connected to the electric switch 32 by way of the electric lines 33, 34 so that, when switch 32 is switched on, both the electric motor 35 and the heating 22 of the continuous flow heater 6 will be energized.

According to FIG. 1, the drive shaft 36 of the electric motor 35 is unrotatably connected to a first toothed wheel 37 which drives a second toothed wheel 38 of larger diameter. Attached in the center of the second toothed wheel 38 in an unrotatable fashion is, in turn, a third toothed wheel 39 of smaller diameter which, on its part, drives a fourth toothed wheel 40 of larger diameter on which a point of support 41 is eccentrically arranged. The point of support 41 causes a driving rod 42 to execute a stroke movement which carries a piston on its end not illustrated in the drawing. The piston is guided in a bore (not shown) of the piston housing 43. Above the piston housing 43, a valve housing 44 follows in which, as is conventional practice in piston pumps, a suction and a pressure valve (not shown) are designed. The piston pump 3 with gear unit 4 will not be dealt with more closely at this point because assemblies of this type are already known from the above-mentioned Espresso machine sold by Braun.

In FIG. 1, a two-way valve 45 which is only hinted at schematically is arranged in the first portion 11 of conduit 13. The two-way valve 45 is connected to the switch 32 in a preferably mechanical manner, as is indicated by the dotted line 46 in FIG. 1. The two-way valve 45 subdivides the first portion 11 of conduit 13 into two conduit portions 11a, 11b, and in the off-position of the two-way valve 45 the conduit portion 11b is connected by way of a relief conduit 47 whose end 48 opens into the feed opening 49 of the water tank 2. The water tank 2 includes at its top area proximate the feed opening 49 a handle 50 which is used to remove the water tank 2 from the steam generating device 1 for the replenishment of water. However, the outlet (not shown) of the water tank 2 must be closed by a valve assembly (not shown) in the outlet when the outlet is isolated from the water conduit 8. A window 51 is provided in the outside wall so that the filling level of the water tank 2 can be better seen.

As can be taken from FIGS. 1 to 3, the outlet 16 of the intermediate tank 5 extends through a pipe 52 into the interior of chamber 53. The free end, that is the chamber outlet 54, of the pipe 52 is arranged at a level H relative to the intake 15 at the bottom 14 of the intermediate tank 5, the said level corresponding to the volume of water which must be received in the chamber 53 until water overflow via the chamber outlet 54 occurs. This volume of water is so dimensioned that, in the event of both the pump 3 and the heating 22 of the continuous flow heater 6 being switched on, the chamber 53 will overflow exactly when the temperature of the continuous flow heater 6 is approximately so high that the water overflowing from the intermediate tank 5 can be evaporated in a sufficient quality in the steam pipe 18.

In FIGS. 2 and 3, the intermediate tank 5 is comprised of a cylindrical housing 55 having a bore 56 of circular cross-section above the chamber outlet 54 in which a valve piston 57 is guided so as to be slidable in a longitudinal direction. A hollow chamber 58 configured as a cylindrical indentation is arranged at the end close to chamber 53. Longitudinal grooves 60 are arranged on the peripheral surface 59 of the valve piston 57, spread over said's circumference, and, starting from chamber 53, grooves 60 pass over into a first annular groove 61 designed in the mid-area of the peripheral surface 59 of the valve piston 57. A first ring seal 62 that is preferably configured as an O-ring is mounted into the first annular groove 61 and seals the bore 56 relative to the first annular groove 61 and, thus, in relation to the valve piston 57. This way, the chamber 53 is formed relative to the chamber 90 connected to the atmosphere. Succeeding the first annular groove 61 in FIGS. 2 and 3 upwards is a second annular groove 63 which has a width that is smaller than the width of the first annular groove 61 though. A second ring seal 64 configured as an O-ring is also mounted into the second annular groove 63 and, in turn, seals the bore 56 relative to the second annular groove 63. The second ring seal 64 seals the annular chamber 91 towards chamber 90.

According to FIGS. 2 and 3, a blind-end bore 65 is arranged at the end of the valve piston 57 opposite to the hollow chamber 58, the said bore 65 housing a spiral spring 66 configured as a compression spring which, on the other side, is supported on a cover 67 inserted into bore 56. Cover 67 at its inside 68 includes a centrally arranged pin 69 which is embraced at its top end by the spiral spring 66 so that the latter is thereby retained in a central position. Diametrally opposite longitudinal grooves 72 which are penetrated by retaining arms 73, 74 designed on the cover 67 are provided on the upper free end 70 of the cylindrical housing 55 according to FIGS. 1 and 2. The retaining arms 73, 74 are deflected in a downward direction at the outside surface of the cylindrical housing 55 and backgrip detents 75, 76 provided on the peripheral surface 92 of the cylindrical housing 55, as is shown in FIG. 1 only. This arrangement retains the cover 67 tightly on the cylindrical housing 55 and closes the bore 56 towards the top. According to FIG. 1, further longitudinal grooves 77, 78 are arranged at the free end 70, offset by 90° relative to the longitudinal grooves 72, and engaged by radially outwardly protruding projections 79, 80. The cover 67 is this way,retained unrotatably and without canting in the bore 56 and may thereby support the force of the spiral spring 66 on the housing 55.

Extending transversely to the longitudinal axis 81 of the intermediate tank 5 in FIGS. 1 to 3 is an outlet 82 designed as a bore in the housing 55, whose discharge opening 83 along with the first ring seal 62 form the actual pressure relief valve 84. In the position of the pressure relief valve 84 shown in FIG. 2, both the first ring seal 62 and the second ring seal 64 bear pressure-tightly in bore 56 below the discharge opening 83 of the outlet 82 so that, should pressure develop in chamber 53 and hollow chamber 58, this pressure will be hindered to discharge via the longitudinal grooves 60 and the ring seals 62, 64 towards the outlet 82 as long as the valve piston 57 has adopted its closing position as illustrated in FIG. 2. When the pressure in chamber 53 and hollow chamber 58 rises, the valve piston 57, after having overcome the friction force between the bore 56 and the ring seals 62, 64 and after having overcome the biassing force of the spiral spring 66, will be moved upwards in the direction X according to FIG. 3 until the ring seal 64 has overridden the outlet 82 in an upward direction and the ring seal 62 has overridden the discharge opening 83 in part or in full in an upward direction.

In the open position of the pressure relief valve 84 shown in FIG. 3, water will preferably flow over the longitudinal grooves 60 past the ring seal 62 to the outlet 82, as indicated by arrows 85 in FIG. 3. The outlet 82 can be in connection to the water tank 2 by way of a return conduit (not shown in the drawings) so that condensate is prevented from discharging sideways at the appliance in an uncontrolled fashion. In FIG. 3, the maximum open position of the pressure relief valve 84 is shown because here the end surface 86 provided on the valve piston 57 abuts on the inside 68 of the cover 67.

As is also shown in FIG. 1, two connecting links 87, 88 which extend in a longitudinal direction 81 and are arranged opposite each other are provided at the free end 70 of the wall 71 of the intermediate tank 5, the said connecting links engaging mating grooves of the housing (not shown) of a steam generating device 1 or a hot beverage preparing machine in order to thereby retain the intermediate tank 5 stationarily in the housing of the appliance. Corresponding retaining arrangements are also provided on the water tank 2, the pump 3, the continuous flow heater 6, the two-way valve 45, and the switch 32. These arrangements are not shown in the drawings, they correspond with similar retaining arrangements in the appliance. The arrangement of the parts illustrated in FIG. 1 in a household applicance, preferably in an Espresso or coffee machine, is not necessarily such as is shown in FIG. 1. Instead, these parts may be positioned farther away from or closer to each other, and they may also be arranged in a different installation position, with the exception of the water tank 2 and the intermediate tank. 5. The important point is that the water tank 2 and the intermediate tank 5 are arranged vertically corresponding to FIG. 1 so that water will not flow out.

The operation of the steam generating device 1 is as follows:

Initially, the water tank 2 is isolated from the water conduit 8 by way of the handle 50 and filled with drinking water at a water tapping point. Subsequently, the water tank 2 with its outlet (not shown) is connected to the water conduit 8, a valve (not shown) designed in the outlet being opened, and water flows to the inlet port 9 of the pump 3. When now the electric switch 32 is actuated to adopt its switch-on position, simultaneously, pump 3 is energized by way of lines 31, 25, 33 and the heating 22 of the continuous flow heater 6 is energized by way of lines 31, 26, and 25. This applies to the heating 22 only if the thermoswitch 27 is closed, that means, the continuous flow heater 6 is cold, so that the line 31 is connected to the line 26.

The electric motor 35 will start to work, causing rotation of the drive shaft 36 and, thus, the first toothed wheel 37. By way of the toothed wheels 38, 39, and 40, the point of support 41 is set to rotate so that the connected driving rod 42 and the piston (not shown) in the piston housing 43 will move up and down. The suction valve (not shown) provided in the inlet port 9 will open during the downward movement of the piston of the pump 3 so that liquid is admitted in the chamber for the valve housing 44.

During the upward movement of the piston of pump 3, the suction valve will close, and simultaneously the pressure valve (not shown) at the outlet port 10 will open. Upon repeated strokes, water is this way delivered into valve 45 via the first conduit portion 11, from where it propagates via the second conduit portion 11b and the intake 15 into the chamber 53 of the intermediate tank 5. The more strokes the pump 3 performs, the more water flows into chamber 53.

Simultaneously with the activation of switch 32, which is mechanically connected to the two-way valve 45, heater 22 will start to heat the steam pipe 18 according to FIG. 1. In the moment when the water delivered by pump 3 has risen so far in chamber 53 that it reached the level H of the chamber outlet 54, the excess water will flow through the pipe 52 and the second portion 17 of conduit 13 into the steam inlet 19 of the steam pipe 18 where it now evaporates. The instantaneous evaporation is possible only because the time which was required to replenish the chamber 53 until the filling level H was just about sufficient to heat the continuous flow heater 6 to such a degree as to enable it to instantaneously evaporate inflowing water.

According to FIG. 1, the evaporated water enters at steam outlet 20 into steam conduit 21 and, at the end of conduit 21, is conducted to steam nozzle 7. In steam nozzle 7, the speed of the steam is considerably increased and, simultaneously, air is aspirated from the side which, when the steam nozzle 7 is immersed into a container with milk, heats the milk, on the one hand, and passes through it, on the other hand, so that the milk is frothed. This process is continued until the milk is adequately hot and sufficiently frothed.

Now the two-way valve 45 is moved by hand by means of an actuating button (not shown) to adopt the zero position so that simultaneously the switch 32 is deactivated by way of the mechanical coupling 46. When the two-way valve is changed over to the zero position, the conduit portion 11a to the conduit portion 11b will be shut off and, at the same time, the conduit portion 11b to the relief conduit 47 opened. Because water no longer flows via the second portion 17 into the steam pipe 18, with the steam nozzle 7 acting as a throttle, steam within the steam pipe 18 is forced via conduit 17 into the chamber 53, forcing water accumulated within this chamber back to water tank 2 via conduit portion 11b, two-way valve 45, conduit 47 and conduit end 48.

According to FIGS. 1 to 3, the hollow chamber 58 designed in the valve piston 57 is preferably used to prevent the steam flowing back to the chamber 53 from condensing in the water and at the walls of chamber 53 (therefore, the intermediate tank 5 and the valve piston 57 are made of a plastic material storing only little thermal energy), with the result that pressure would not be provided for a time sufficiently long for the return of the water from chamber 53 of the intermediate tank 5. The hollow chamber 58 takes up the steam that flows back from the chamber port 54 of the pipe 52 without losing substantial heat and condensing. This ensures that pressure is still at disposal in chamber 58 for a sufficiently long time which permits displacing the water from the chamber 53 and returning it into the water tank 2. The intermediate tank 5 is emptied upon completion of the steam generation process this way, and the procedure described hereinabove may recommence. The water tank 2 may be emptied manually after return of the water.

The purpose of the pressure relief valve 84 according to FIGS. 2 and 3 is that in case the pressure in the chamber 53 rises excessively, for example due to calcification in the steam pipe 18 or because the steam nozzle 7 or the steam pipe are clogged, this pressure will be decreased by control. This means that if the force acting on the valve piston 57 increases, the valve piston 57 according to FIGS. 2 and 3 will move in an upward direction after having overcome the friction forces between the seals 62, 64 and the bore 56 and after having overcome the biassing force of the spring 66 in the bore 56. In this arrangement, seal 64 initially overrides the outlet 82 and, upon further displacement of the valve piston 57 in the direction X upwards, the ring seal 62 will override the outlet 82 in part or entirely, so that steam may exit from chamber 53 and propagate via the longitudinal grooves 60 and past the ring seal 62 into the outlet 82, as is indicated in FIG. 3. It is this way prevented that the parts of the steam generating device 1 are unnecessarily stressed or damaged by the rising pressure.

The special purpose of the second ring seal 64 is to prevent water and, possibly, even steam from flowing from the annular chamber 91 into the chamber 90 provided between the end surface 86 of the valve piston 57 and the cover 67 in the open position of the pressure relief valve 84 according to FIG. 3. After pressure reduction in the chamber 53, the valve piston 57 is urged by the force of spring 66 to adopt its closed position again, as shown in FIG. 2, when the force of the valve piston 57, which develops due to the pressure in chamber 53, is lower than the force of the spiral spring 66 which is applied to the valve piston 57 from the other side. Friction forces at the seals 62, 64 will be ignored in this respect.

It should still be mentioned that, admittedly, a certain time will lapse for a user after switch-on of the steam generating device 1 until steam exits from the steam nozzle 7. However, this delay time is acceptable because the pump 3 is already activated, and its operation is perceived by a user thus knowing that the steam generating device 1 is working and will deliver steam shortly afterwards. If, on the other hand, as is known from the state of the art, the pump 3 would be set in action only when the continuous flow heater 6 has reached its operating temperature, a display would have to be provided on the appliance indicating that the appliance is not yet ready for operation, or is being preheated. Such costly provisions can be economized by pump 3 working already and making corresponding noise.

For a possible cleaning of the intermediate tank 5 in a servicing station, the cover 67 can be removed from the cylindrical housing 55 by detaching the retaining arms 73, 74 from the detents 75, 76. Subsequently, the valve piston 57 along with the spring 66 can be withdrawn from the bore 56 so that replacement of e.g. the seals 62, 64 or other maintenance measures such as greasing the bore 56 and the valve piston 57 can be effected.

What is claimed is:

1. A steam generating device for heating and/or frothing liquids, comprising:
   an electrically driven pump furnished with water from a water source;
   a steam pipe of a continuous flow heater which is connected to the pump by way of a conduit and is heated electrically, the continuous flow heater in turn being connected to a steam tapping point; and
   an intermediate tank disposed between the pump and heater and containing an enlarged overflow chamber for accumulating a defined quantity of water, the overflow chamber including an intake and a discharge, wherein the intake is connected to an outlet port of the pump by way of a first portion of the conduit, and the discharge is connected to an intake of the steam pipe of the continuous flow heater by way of a second portion of the conduit.

2. The steam generating device of claim 1, wherein the chamber has an outlet disposed above an inlet of the chamber, such that liquid collects in the chamber before entering the outlet.

3. The steam generating device of claim 1, wherein the intermediate tank includes a pressure relief outlet controlled by a pressure relief valve responsive to pressure in the chamber.

4. The steam generating device of claim 3, wherein adjacent to the chamber of the intermediate tank above the maximum filling level is a pressure chamber, the pressure chamber is a blind-end bore, the outlet being configured as a channel opening into a wall of the pressure chamber, and wherein the pressure relief valve comprises a valve piston displaceable in opposition to the force of a spring to expose the outlet.

5. The steam generating device of claim 4, characterized in that the valve piston defines a hollow chamber configured as an indentation on a side of the piston facing the chamber.

6. The steam generating device of claim 1, wherein the steam tapping point comprises a steam nozzle.

7. The steam generating device of claim 6, wherein an outlet of the continuous flow heater is attached to a steam conduit, and the steam nozzle is detachably fastened and sealed to an outlet of the steam conduit.

8. The steam generating device of claim 1, wherein the continuous flow heater includes a heating rod, the heating rod including contact lugs connected to two electric lines, and wherein one of the electric lines is connected to a temperature switch.

9. The steam generating device of claim 8, wherein an electric inlet line connects the temperature switch to an electric switch, and the electric switch activates or deactivates the steam generating device.

10. The steam generating device of claim 1, wherein the continuous flow heater is U-shaped.

11. The steam generating device of claim 1, wherein the continuous flow heater has a thermoblock configuration.

12. The steam generating device of claim 1, wherein the first portion of the conduit includes a two-way valve operable by a switch.

13. The steam generating device of claim 12, wherein the valve is configured to, in a first position, direct water from the pump to the intermediate tank, and to, in a second position, return water from the intermediate tank to the water source.

14. The steam generating device of claim 12, wherein the switch is operable to turn on the pump.

15. The steam generating device of claim 1, wherein the water source comprises a removable tank.

16. A steam generating device for heating and/or frothing liquids, comprising:
   an electrically driven pump furnished with water from a water source;
   a steam pipe of a continuous flow heater which is connected to the pump by way of a conduit and heated electrically;
   a steam tapping point connected to the continuous flow heater;
   an intermediate tank located in the conduit between the pump and the steam pipe, the intermediate tank containing an overflow chamber which stores a defined quantity of water, and an outlet to the atmosphere which is controllable by a pressure relief valve responsive to pressure in the chamber; and
   a pressure chamber, adjacent to the chamber of the intermediate tank above the maximum filling level, the pressure chamber being a blind-end bore, the outlet being configured as a channel opening into a wall of the pressure chamber, wherein the pressure relief valve comprises a valve piston displaceable in opposition to the force of a spring to expose the outlet.

17. The steam generating device of claim 16, characterized in that the valve piston defines a hollow chamber configured as an indentation on a side of the piston facing the chamber.

* * * * *